United States Patent
Liu

(10) Patent No.: US 8,408,507 B2
(45) Date of Patent: Apr. 2, 2013

(54) LOCKING DEVICE

(76) Inventor: Chi-Perng Liu, Taichung (TW)

( * ) Notice: Subject to any disclaimer, the term of this patent is extended or adjusted under 35 U.S.C. 154(b) by 140 days.

(21) Appl. No.: 12/898,772

(22) Filed: Oct. 6, 2010

(65) Prior Publication Data

US 2012/0084945 A1 Apr. 12, 2012

(51) Int. Cl.
*A47B 96/06* (2006.01)
(52) U.S. Cl. .................... 248/230.4; 248/230.5; 24/538; 24/499
(58) Field of Classification Search ............... 248/230.1, 248/230.4, 230.5, 230.7, 231.51, 231.61, 248/231.71, 231.81, 316.5, 316.6, 65, 70, 248/74.1; 24/489, 513, 516, 517, 538, 455, 24/499, 500, 502, 504, 509, 510, 523, 524; 269/91, 92, 142, 143, 150, 160, 162, 163, 269/188, 254 CS, 254 C
See application file for complete search history.

(56) References Cited

U.S. PATENT DOCUMENTS

| | | | |
|---|---|---|---|
| 3,084,409 A * | 4/1963 | Griffiths ...................... 24/132 R |
| 4,492,005 A * | 1/1985 | Begley et al. .................. 24/270 |
| 5,305,978 A * | 4/1994 | Current ...................... 248/230.4 |
| 5,622,341 A * | 4/1997 | Stana ........................... 248/74.1 |
| 6,450,465 B1 * | 9/2002 | Eslick ........................ 248/230.4 |
| 6,561,471 B1 * | 5/2003 | Hawie ............................ 248/201 |
| 8,085,481 B2 * | 12/2011 | Hill ................................ 359/818 |
| 8,162,343 B2 * | 4/2012 | Weiss et al. ................... 280/276 |
| 8,317,526 B2 * | 11/2012 | Gardner et al. ............... 439/100 |

* cited by examiner

*Primary Examiner* — Alfred J Wujciak

(74) *Attorney, Agent, or Firm* — Brinks Hofer Gilson & Lione

(57) ABSTRACT

A locking device includes: a pivot rod extending through a connecting block of a U-shaped seat and through a connecting block of a rotary cover such that the rotary cover is rotatable relative to the seat between unlocking and locking positions; a resilient member for biasing the rotary cover to move toward the locking position; and a position-limiting unit including a guiding groove formed in one of the connecting block and the pivot block, and a guiding rod provided on the other one of the connecting block and the pivot block, and extending into and engaging movably the guiding groove. When the guiding rod is limited and engaged in one end of the guiding groove, the rotary cover is positioned at the unlocking position, where the rotary cover is spaced apart from the seat.

5 Claims, 9 Drawing Sheets

LOCKING DEVICE

BACKGROUND OF THE INVENTION

1. Field of the Invention

The invention relates to a locking device, and more particularly to a locking device capable of controlling rotation of a rotary cover.

2. Description of the Related Art

FIGS. 1 to 3 illustrate a conventional locking device 10 that includes a U-shaped seat 11, a rotary cover 12, a pivot rod 13 and a resilient member 14.

The seat 11 includes a base block 111, opposite lateral blocks 112, 113 extending upwardly from the base block 111 and cooperating with the base block 111 to define an accommodating space 114 for receiving an article (not shown), and spaced apart first and second connecting blocks 115, 116 extending from a top surface of the second lateral block 113.

The rotary cover 12 includes a curved cover body 121, and spaced apart first and second pivot blocks 122, 123 extending from the cover body 121. The first pivot block 122 is disposed adjacent to the first connecting block 115. The second pivot block 123 is disposed between the first and second connecting blocks 115, 116.

The pivot rod 13 extends through the first pivot block 122, through the first connecting block 115, through the second pivot block 123 and through the second connecting block 116 such that the rotary cover 12 is rotatable relative to the seat 11 between an unlocking position and a locking position.

The resilient member 14 includes a first positioning bolt 141 mounted fixedly on the first pivot block 122 of the rotary cover 12, a second positioning bolt 142 mounted fixedly on the second lateral block 113, and a coil spring 143 connected between the first and second positioning bolts 141, 142 for biasing the rotary cover 12 to move toward the seat 11.

When the rotary cover 12 is at the locking position, the rotary cover 12 cooperates with the seat 11 to embrace the article received in the accommodating space 114.

As shown in FIGS. 2 and 3, when the rotary cover 12 is at the unlocking position, the article can be released. However, when the rotary cover 12 is moved from the locking position to the unlocking position, the coil spring 143 is extended to store a recovery force. Therefore, it is required for movement of the rotary cover 12 from the locking position to the unlocking position to apply to the rotary cover 12 a force greater than the recovery force of the coil spring 143 until the rotary cover 12 collides with the second lateral block 113. Due to collision between the rotary cover 12 and the seat 11, damage to the seat 11 or the rotary cover 12 may not be avoided.

SUMMARY OF THE INVENTION

Therefore, an object of the present invention is to provide a locking device that can overcome the aforesaid disadvantage of the prior art.

According to one aspect of the present invention, a locking device comprises:

a U-shaped seat including a base block, and first and second lateral blocks opposite to each other in a first direction, extending upwardly from the base block and cooperating with the base block to define an accommodating space adapted for receiving an article, the seat further including at least one first connecting block extending from a stop surface of the second lateral block;

a rotary cover including a cover body, and at least one first pivot block extending from the cover body;

a pivot rod extending through the first connecting block of the seat, and through the first pivot block of the rotary cover such that the rotary cover is rotatable relative to the seat between an unlocking position, and a locking position, where the seat cooperates with the rotary cover to embrace the article received in the accommodating space;

a resilient member connected between the seat and the rotary cover for biasing the rotary cover to move toward the locking position; and a position-limiting unit including a guiding groove formed in one of the first connecting block of the seat and the first pivot block of the rotary cover, and a guiding rod provided on the other one of the first connecting block of the seat and the first pivot block of the rotary cover and engaging movably the guiding groove, the guiding groove having a first end in proximity to the accommodating space.

When the guiding rod is limited and engaged in the first end of the guiding groove, the rotary cover is positioned at the unlocking position, where the rotary cover is spaced apart from the top surface of the second lateral block of the seat.

According to another aspect of the present invention, a locking device comprises:

a U-shaped seat having a connecting block;
a rotary cover having a pivot block;
a pivot rod extending through the connecting block of the seat and through the pivot block of the rotary cover such that the rotary cover is rotatable relative to the seat; and
a position-limiting unit including
a guiding groove formed in one of the connecting block of the seat and the pivot block of the rotary cover and having opposite ends, and
a guiding rod provided on the other one of the first connecting block of the seat and the first pivot block of the rotary cover, and engaging movably the guiding groove such that the guiding rod is limited to movement along the guiding groove between the opposite ends.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
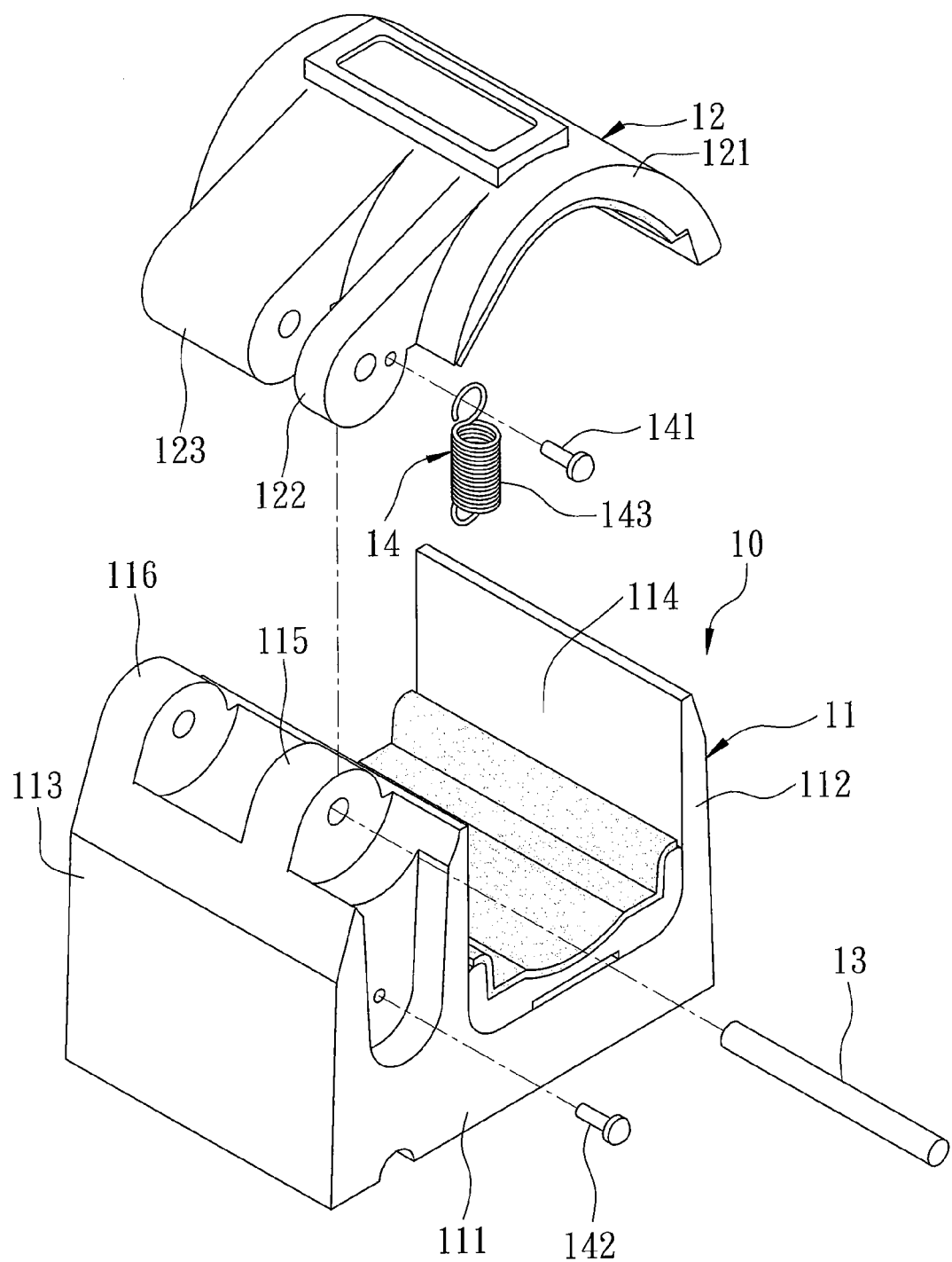
FIG. 1 is an exploded perspective view of a conventional locking device.
Figure 2:
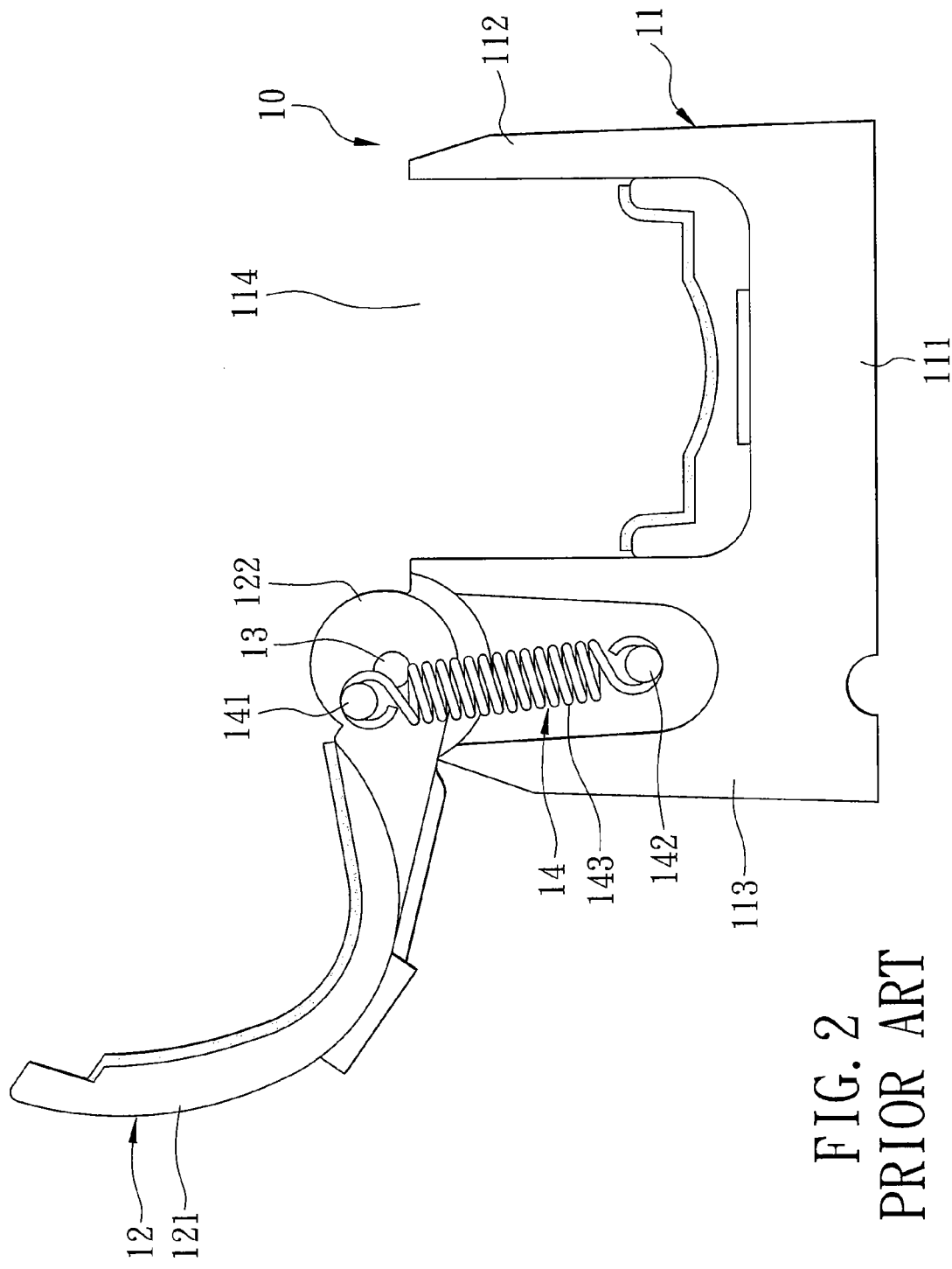
FIG. 2 is a schematic front view of the conventional locking device when a rotary cover is at an unlocking position.
Figure 3:
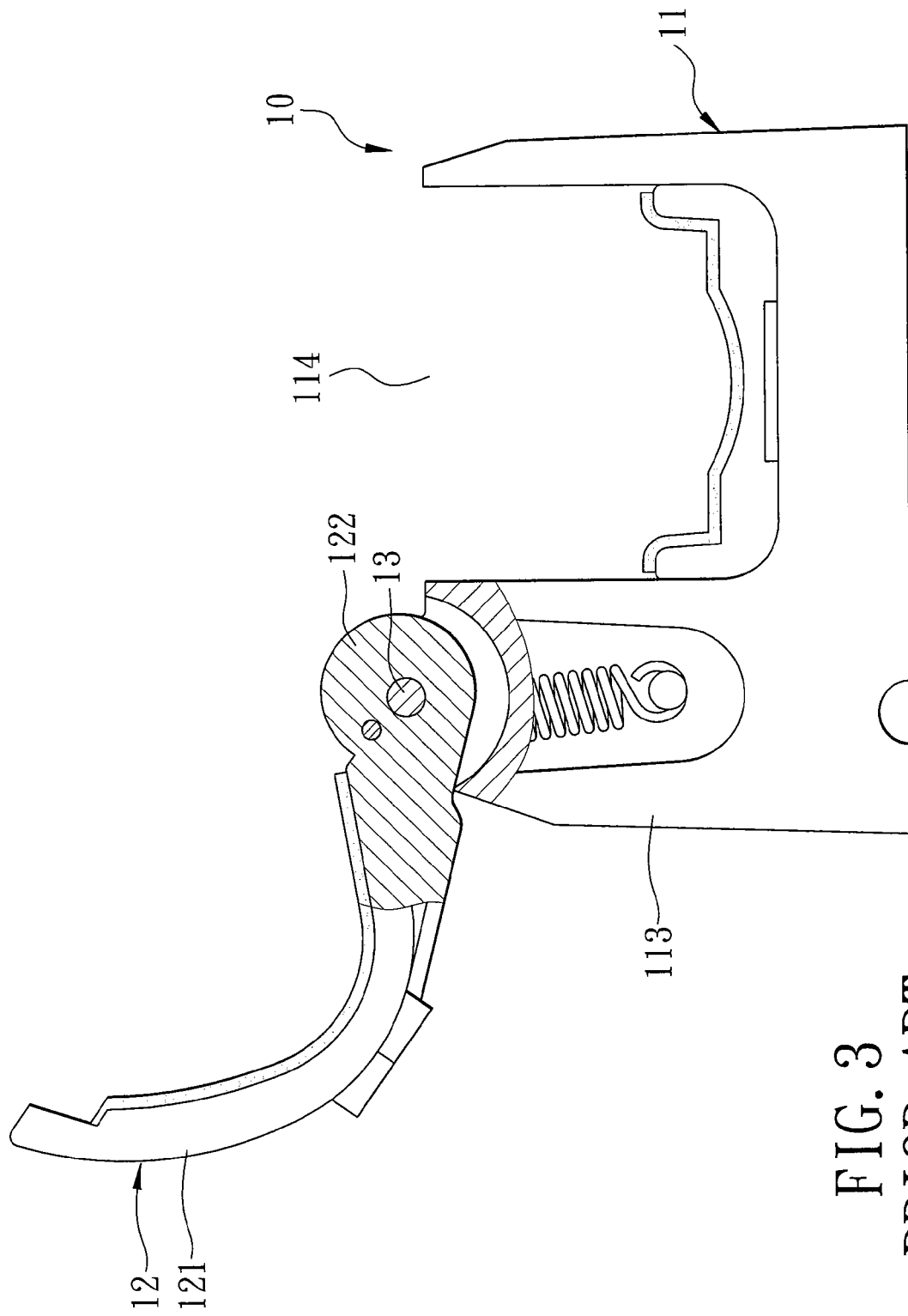
FIG. 3 is a partially sectional schematic view of the conventional locking device when the rotary cover is at the unlocking position.
Figure 4:
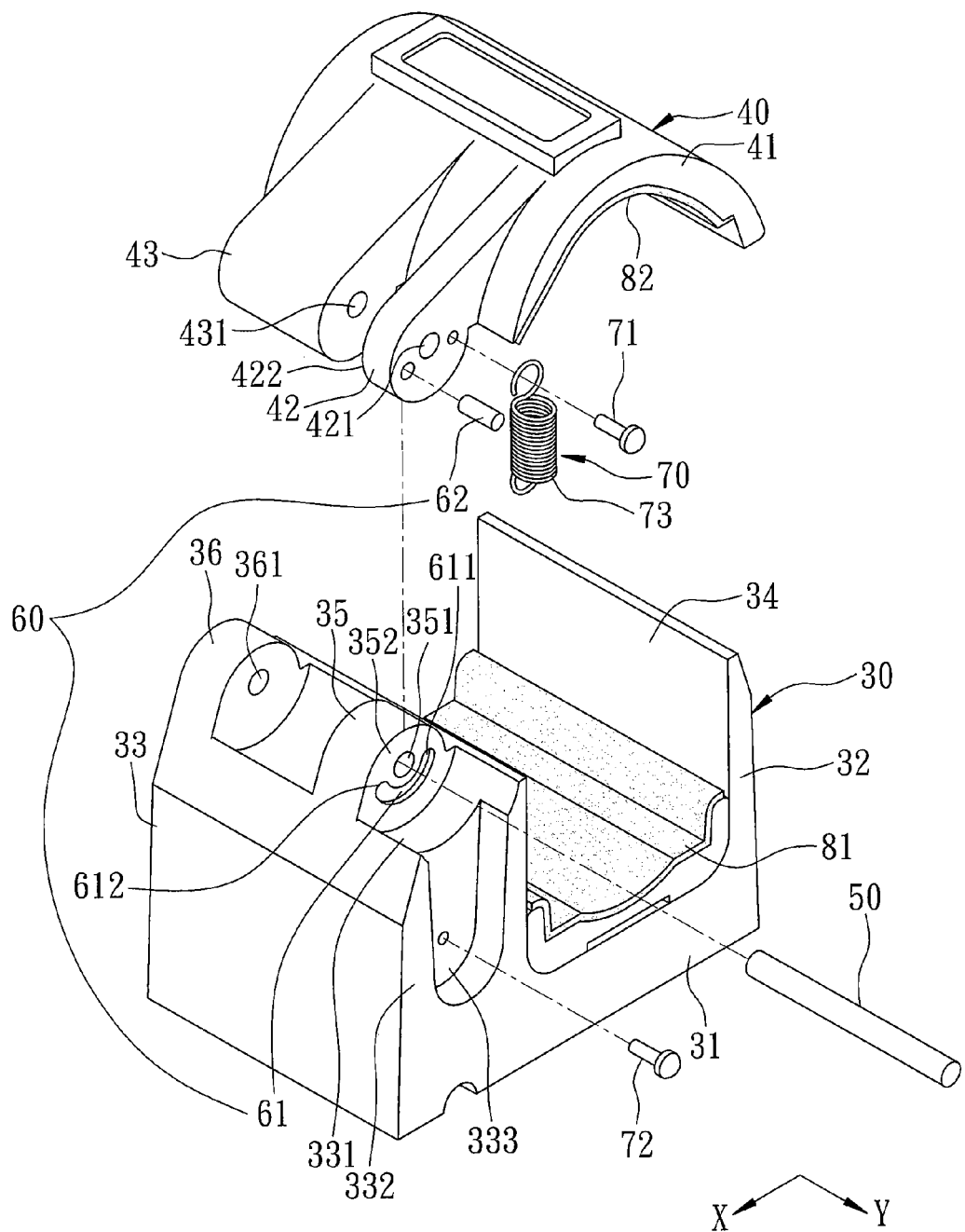
FIG. 4 is an exploded perspective view showing the preferred embodiment of a locking device according to the present invention.
Figure 5:
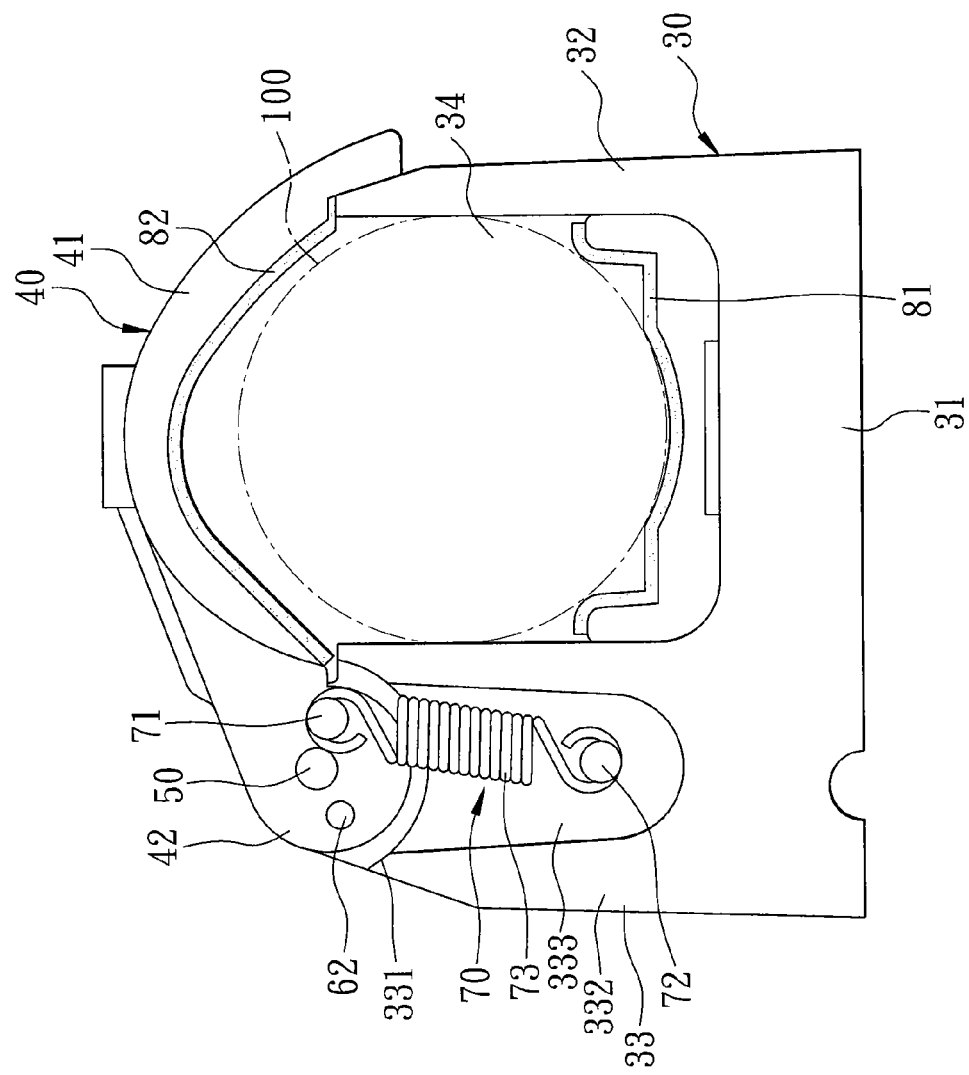
FIG. 5 is a schematic front view showing the preferred embodiment when a rotary cover is at a locking position.

Referring to FIGS. 4 and 5, the preferred embodiment of a locking device according to the present invention is shown to include a U-shaped seat 30, a rotary cover 40, a pivot rod 50, a position-limiting unit 60, and a resilient member 70.

The seat 30 includes a base block 31, and first and second lateral blocks 32, 33 opposite to each other in a first direction (X), extending upwardly from the base block 31 and cooperating with the base block 31 to define an accommodating space 34 adapted for receiving an article 100 (see FIG. 5). The second lateral block 33 has a front surface 332 formed with a spring-receiving groove 333 that extends downwardly from the top surface 331. The seat 30 further includes first and second connecting blocks 35, 36 extending from a concave top surface 331 of the second lateral block 33 and spaced apart from each other in a second direction (Y) that is transverse to the first direction (X). The first connecting block 35 is disposed in front of the second connecting block 36. The first connecting block 35 is formed with a through hole 351 extending in the second direction (Y). The second connecting block 36 is formed with a blind hole 361 extending from a front side thereof in the second direction (Y) and aligned with the through hole in the first connecting block 351. Preferably, a soft protection layer 81 is disposed over a top surface of the base block 31.

The rotary cover 40 includes a curved cover body 41, and first and second pivot blocks 42, 43 extending from the cover body 41 and spaced apart from each other in the second direction (Y). The first pivot block 42 is disposed in front of the first connecting block 35. The second pivot block 43 is disposed between the first and second connecting blocks 35, 36. Each of the first and second pivot blocks 42, 43 is formed with a through hole 421, 431 extending in the second direction (Y) and aligned with the through hole 351 in the first connecting block 35. Preferably, a soft protection layer 82 is disposed over an inner surface of the cover body 82.

The pivot rod 50 extends through the through hole 421 in the first pivot block 42, through the through hole 351 in the first connecting block 351, through the through hole 431 in the second pivot block 43 and into the blind hole 361 in the second connecting block 36.

The rotary cover 40 is thus rotatable relative to the seat between an unlocking position, and a locking position, where the seat 30 cooperates with the rotary cover 40 to embrace the article 100 received in the accommodating space 34, as shown in FIG. 5.

Figure 7:
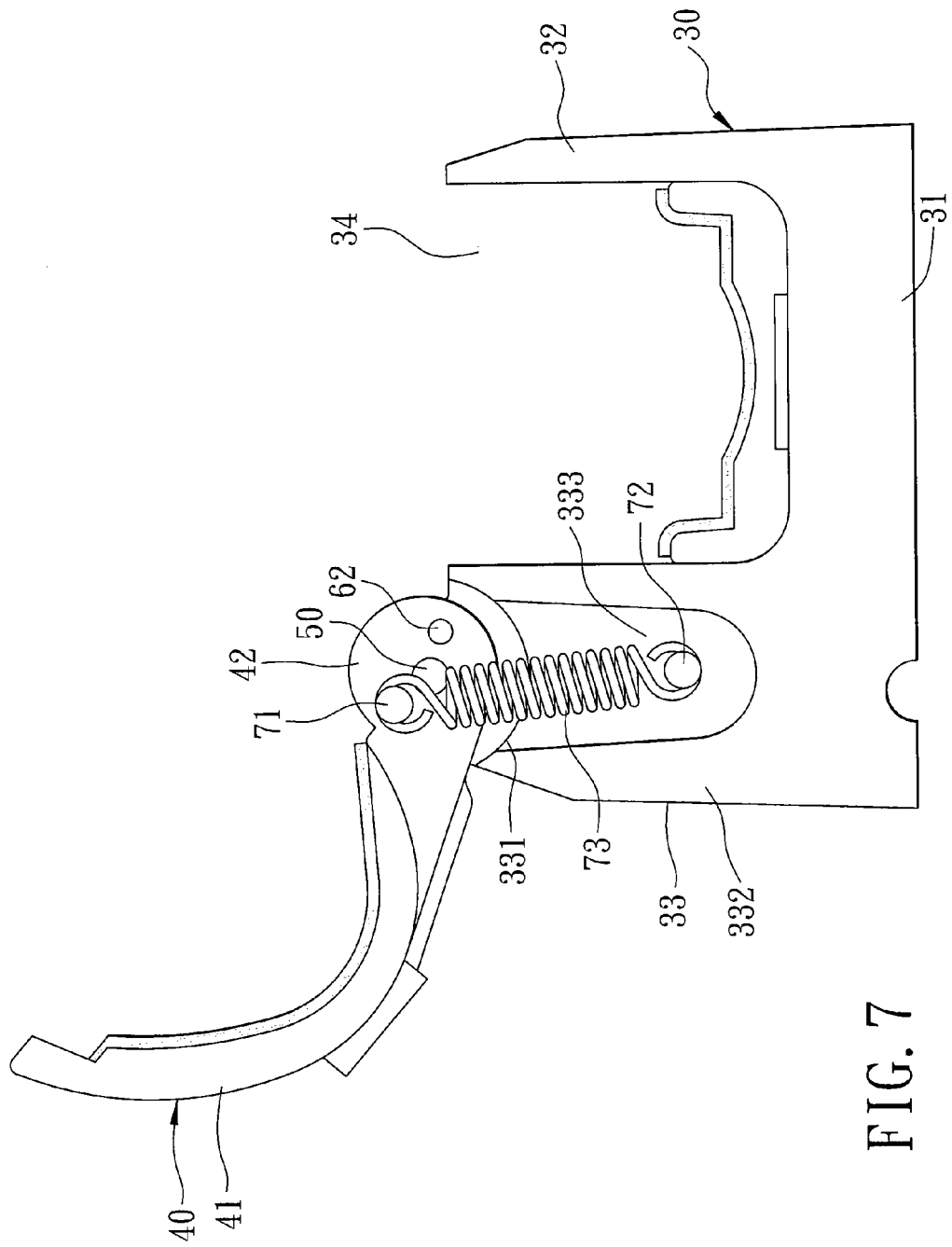
FIG. 7 is a schematic front view showing the preferred embodiment when the rotary cover is at an unlocking position.

The resilient member 70 is connected between the seat 30 and the rotary cover 40 for biasing the rotary cover 40 to move toward the locking position to thereby achieve a locking effect. In this embodiment, the resilient member 70 includes a first positioning bolt 71 mounted fixedly on a front side of the first pivot block 42 of the rotary cover 40, a second positioning bolt 72 mounted fixedly on the second lateral block 33 and disposed in the spring-receiving groove 333 in the second lateral block 33 of the seat 30, and a spring 73, such as a coil spring, received in the spring-receiving groove 333 in the second lateral block 33 of the seat 30 and having opposite ends connected respectively to the first and second positioning bolts 71, 72. When the rotary cover 40 is at the unlocking position, the spring 73 is extended to thereby store a recovery force therein, as shown in FIG. 7.

Figure 6:
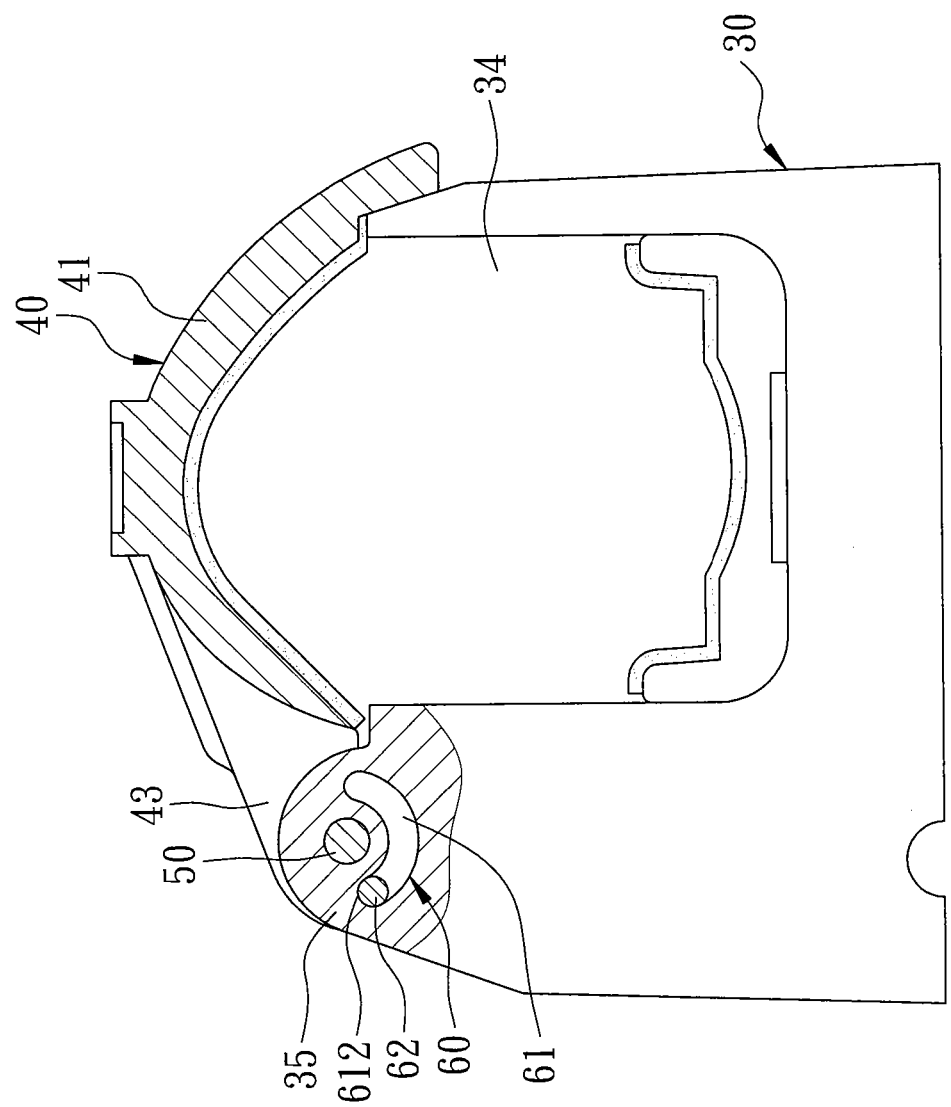
FIG. 6 is a partially sectional schematic view showing the preferred embodiment when the rotary cover is at the locking position.
Figure 8:
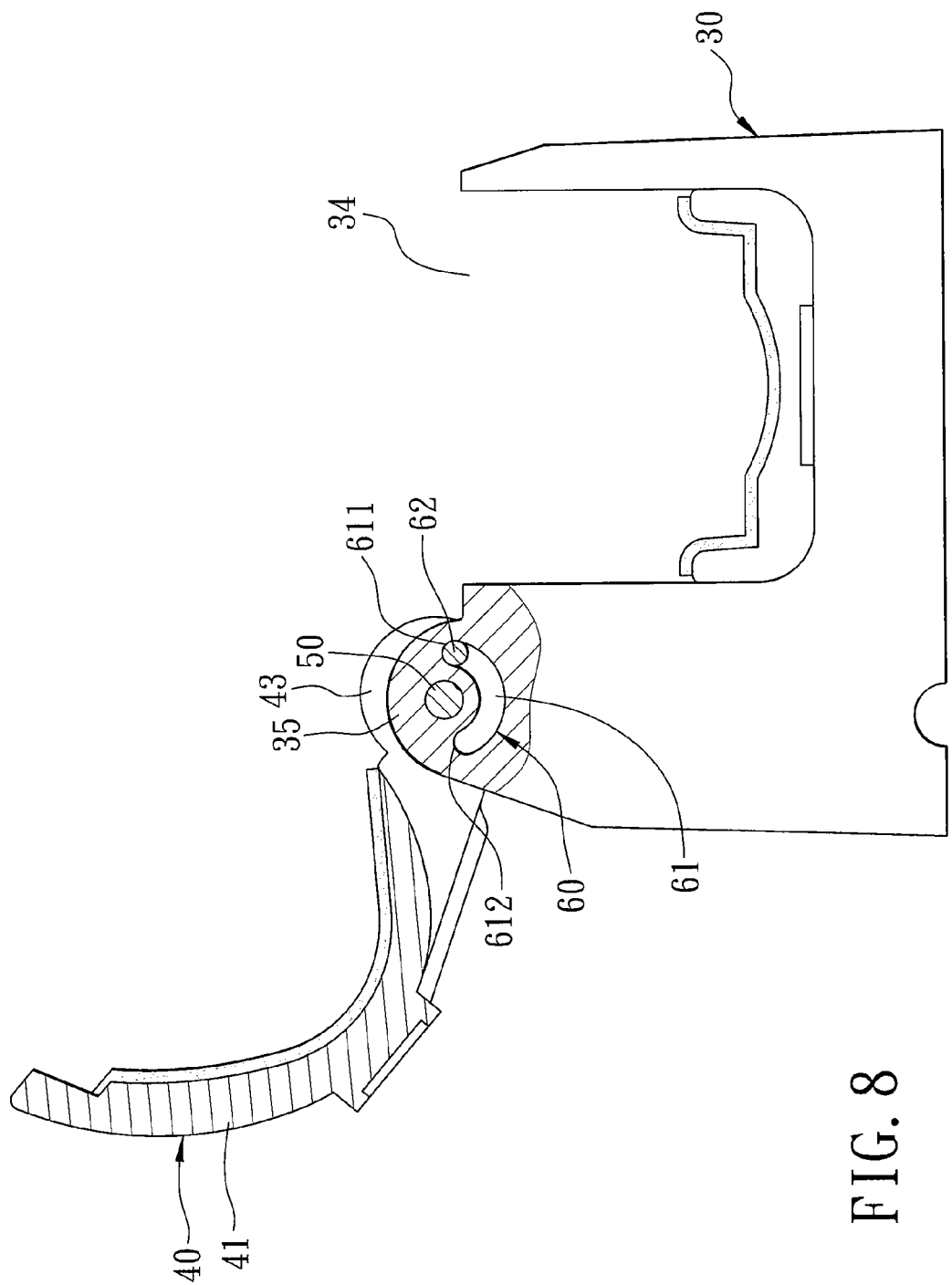
FIGS. 8 and 9 are partially sectional schematic views showing the preferred embodiment when the rotary cover is at the unlocking position.
Figure 9:
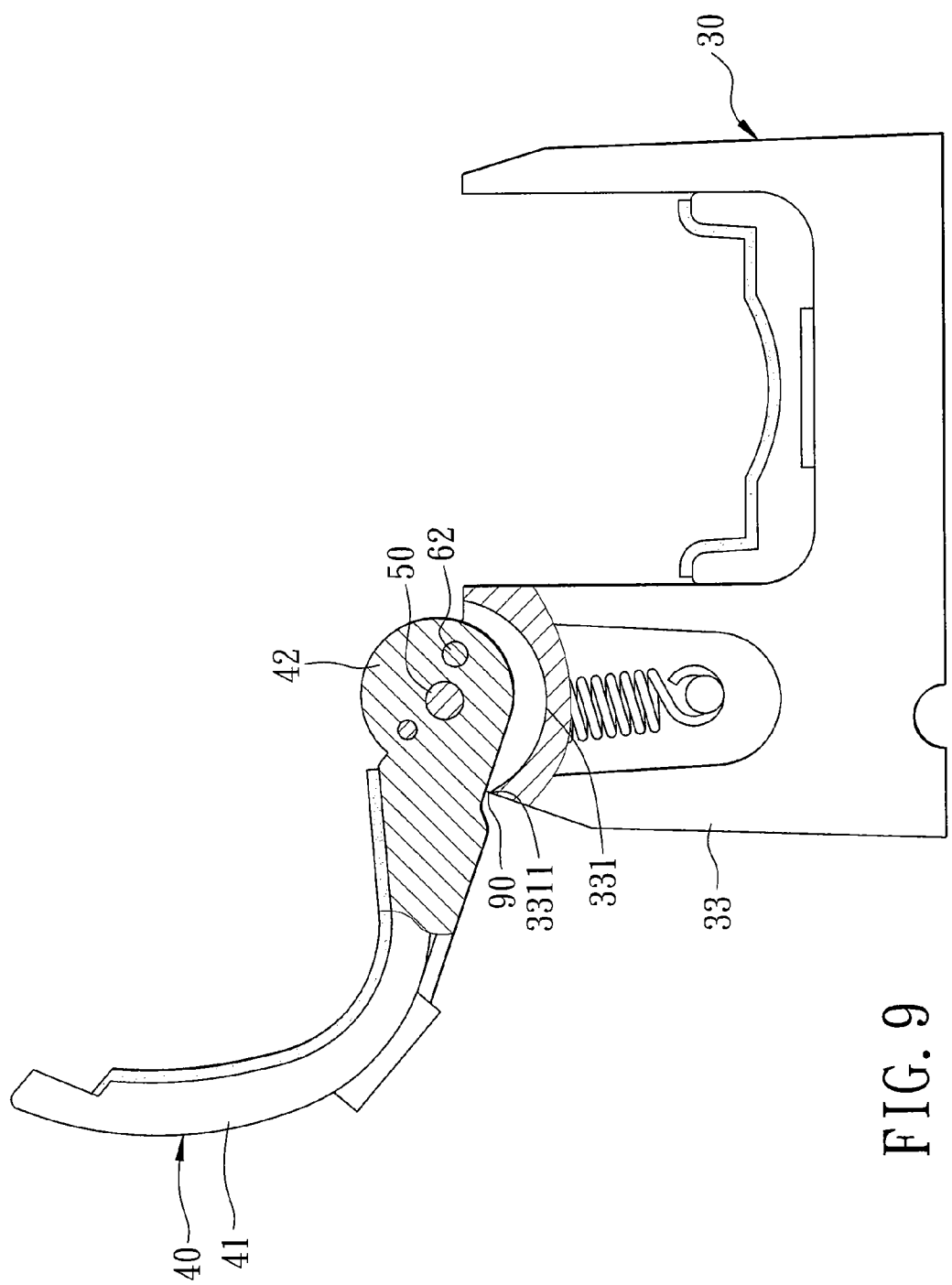

The position-limiting unit 60 includes an arched guiding groove 61 formed in a front surface 352 of the first connecting block 35 of the seat 30, and a guiding rod 62 provided on a rear surface 422 of the first pivot block 42 of the rotary cover 40. The guiding rod 62 extends into and engages movably the guiding groove 61. The guiding groove 61 has a first end 611 in proximity to the accommodating space 34, and a second end 612 opposite to the first end 611 and distal from the accommodating space 34. The guiding rod 62 is limited to movement along the guiding groove 71 between the first and second ends 611, 612. When the guiding rod 62 is limited and engaged in the second end 612 of the guiding groove 61, the rotary cover 40 is positioned at the locking position, as shown in FIG. 6. When the guiding rod 62 is limited and engaging in the first end 611 of the guiding groove 61, the rotary cover 40 is positioned at the unlocking position, as shown in FIG. 8. At the unlocking position the rotary cover 40 is also spaced apart from a lateral edge 3311 of the top surface 331 of the second lateral block 33 of the seat 30 with a gap 90, as shown in FIG. 9.

In sum, due to the presence of the position-limiting unit 60, the rotary cover 40 does not collide with the seat 30 during rotation of rotary cover 40 from the locking position to the unlocking position. Therefore, damage to the seat 30 and the rotary cover 40 as encountered in the aforesaid conventional locking device 10 can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A locking device comprising:
   a U-shaped seat including a base block, and first and second lateral blocks opposite to each other in a first direction, extending upwardly from said base block and cooperating with said base block to define an accommodating space adapted for receiving an article, said seat further including at least one first connecting block extending from a stop surface of said second lateral block;
   a rotary cover including a cover body, and at least one first pivot block extending from said cover body;
   a pivot rod extending through said first connecting block of said seat, and through said first pivot block of said rotary cover such that said rotary cover is rotatable relative to said seat between an unlocking position, and a locking position, where said seat cooperates with said rotary cover to embrace the article received in said accommodating space;
   a resilient member connected between said seat and said rotary cover for biasing said rotary cover to move toward the locking position; and
   a position-limiting unit including an arched guiding groove formed in a surface of one of said first connecting block of said seat and said first pivot block of said rotary cover that faces the other one of said first connecting block of said seat and said first pivot block of the rotary cover, and a guiding rod provided on the other one of said first connecting block of said seat and said first pivot block of said rotary cover, extending into and engaging movably said guiding groove, said guiding groove having a first end in proximity to said accommodating space;
   wherein, when said guiding rod is limited and engaged in said first end of said guiding groove, said rotary cover is positioned at the unlocking position, where said rotary cover is spaced apart from said top surface of said second lateral block of said seat.

2. The locking device as claimed in claim 1, wherein said guiding groove of said position-limiting unit further has a second end opposite to said first end and distal from said accommodating space; and
   wherein, when said guiding rod is limited and engaged in said second end of said guiding groove, said rotary cover is positioned at the locking position.

3. The locking device as claimed in claim 1, wherein said resilient member includes a first positioning bolt mounted fixedly on said first pivot block of said rotary cover, a second positioning bolt mounted fixedly on said second lateral block of said base, and a spring having opposite ends connected respectively to said first and second positioning bolts.

4. The locking device as claimed in claim 1, where:
- said seat further includes a second connecting block extending from said top surface of said second lateral block, and spaced apart from said first connecting block in a second direction transverse to the first direction;
- said rotary cover further includes a second pivot block extending from said cover body, spaced apart from said first pivot block in the second direction, and disposed between said first and second connecting blocks of said seat; and
- said pivot rod further extends through said second pivot block of said rotary cover and into said second connecting block of said seat.

5. A locking device comprising:
- a U-shaped seat having a connecting block;
- a rotary cover having a pivot block;
- a pivot rod extending through said connecting block of said seat and through said pivot block of said rotary cover such that said rotary cover is rotatable relative to said seat; and
- a position-limiting unit including
  - an arched guiding groove formed in a surface of one of said connecting block of said seat and said pivot block of said rotary cover that faces the other one of said connecting block of said seat and said pivot block of the rotary cover, and having opposite ends, and
  - a guiding rod provided on the other one of said connecting block of said seat and said pivot block of said rotary cover, and extending into and engaging movably said guiding groove such that said guiding rod is limited to movement along said guiding groove between said opposite ends.

\* \* \* \* \*